United States Patent [19]
Hancock

[11] Patent Number: 4,607,772
[45] Date of Patent: Aug. 26, 1986

[54] RIFLE CARRIER FOR MOTORCYCLE

[75] Inventor: Dennis Hancock, 491 S. Main, Cedar City, Utah 84720

[73] Assignees: George Gates; Dennis Hancock, both of S. Jordan, Utah

[21] Appl. No.: 633,463

[22] Filed: Jul. 23, 1984

[51] Int. Cl.⁴ ............................................. B62J 7/06
[52] U.S. Cl. .................... 224/30 A; 224/41
[58] Field of Search .................. 224/30 R, 30 A, 31, 224/32 R, 35, 36, 39, 41, 42; 280/289 R, 289 A

[56] References Cited

U.S. PATENT DOCUMENTS

| | | | |
|---|---|---|---|
| 553,614 | 1/1896 | Handloser | 224/39 |
| 3,237,899 | 3/1966 | Lewis | 224/39 R |

FOREIGN PATENT DOCUMENTS 104044  2/1917  United Kingdom ................. 224/35

*Primary Examiner*—Stephen Marcus
*Assistant Examiner*—David Voorhees
*Attorney, Agent, or Firm*—Thorpe, North & Western

[57] ABSTRACT

A utility holding device for carrying elongated objects such as a rifle at the handlebars of a motorcycle. The device includes a clamp for attachment to the handlebars, a support base attached to the clamp, a mounting stem which is adjustably attached in a threaded opening in the support base and a holding member coupled to the mounting stem and configured to support and lock an object in fixed position at the handlebars.

12 Claims, 4 Drawing Figures

RIFLE CARRIER FOR MOTORCYCLE

BACKGROUND OF THE INVENTION

1. Field of the Invention

The present invention relates to a utility carrier for attachment to the handlebars of a motorcycle. More specifically, the subject invention pertains to a utility carrier adapted for holding a rifle or similarly shaped elongated object in a fixed and stable position at the handlebars.

2. Background of the Invention

Motorcycles represent one of the more versatile forms of transportation. They are adapted for highway travel, as well as being an off-road vehicle. Because of the many forms of use to which a motorcycle is applied, there has existed a long-felt need for a utility carrier device which can be attached to the handlebars to hold a rifle, baseball bat, long tool, etc.

Prior art attempts to mount a carrier device at the handlebars of a motorcycle have failed to provide the versatility required for a general utility-type carrying device. For example, a fully functional carrier needs to provide vertical adjustment without the attendant risk of inadvertent release from the adjusted position. Because motorcycles are generally subject to vibrations which can easily loosen typical locking devices, they may unexpectedly slide to a lower position because of the weight of the rifle or device carried.

Prior art attempts to attach holding devices to the handlebars have generally been designed for a specific application. For example, a clamping device may be attached to the handlebars for holding a light, a radio, mirror or some other specific item. In addition, attachment of a general utility carrier has been also hampered by the limited frame space available for attachment. It is generally known that the handlebars of a motorcycle already carry grip brakes, headlamp controls, mirrors, ignition switches, etc. Therefore, very little space remains for attachment of a general utility carrying device.

U.S. Pat. Nos. 553,614 and 672,540 are representative of devices designed for mounting a rifle to a bicycle. U.S. Pat. No. 553,614 shows a bracket for attaching a rifle to the handlebars; however, no means for vertical adjustment is provided and the structure is typically not suited for motorcycle adaptation. Likewise, U.S. Pat. No. 672,540 provides for attachment of a rifle to the bicycle; however, this method of attachment is not suitable for a motorcycle because of the gas tank location, as well as other structural limitations on the motorcycle. U.S. Pat. No. 1,735,212 illustrates a clamp for attaching a flashlight to a bicycle. Likewise, it fails to suggest vertical adjustment means or a structure well suited for holding an elongated object such as a rifle. Finally, U.S. Pat. No. 4,436,350 discloses clamping apparatus which offers vertical adjustment; however, is designed specifically for attachment of a radio or some other device having its own clamping means.

OBJECTS AND SUMMARY OF THE INVENTION

It is therefore an object of the present invention to provide a utility carrying device in which an elongated member such as a rifle can be laid and securely retained in place.

A further object of the present invention is to provide a detachable utility rack which can be clamped to the handlebars of a motorcycle and which is capable of locking an elongated carried item in place such that it does not jar free from vibrations or bumps encountered by the motorcycle.

It is a further object of this invention to provide a utility rack which is capable of vertical adjustment which remains secure.

These and other objects are realized in a utility holding device for attachment to handlebars of a motorcycle which comprises (i) a clamp configured for attachment to the handlebars, (ii) a support plate to which the clamp is attached, and (iii) a holding member that is mounted on a threaded stem which screws into the support plate. The holding member is formed from a bar which is bent to a partially closed configuration with the respective ends of the bar forming an opening through which an object can be inserted. The holding member includes an upper half which contains the object opening, and a lower half to which the stem is attached. The mounting stem is threaded to allow the rotational adjustment of the holding member. This rotational movement provides vertical adjustment to the device as well as adapting the device with locking structure for retaining the carried position. The upper half of the holding member may be adapted with an elbow or cocked end which operates as a catch for gripping the contained object and preventing it from sliding free from the holding member.

Other objects and features of the present invention will be apparent to those skilled in the art based upon the detailed description, taken in connection with the drawings which are described as follows.

Figure 2:
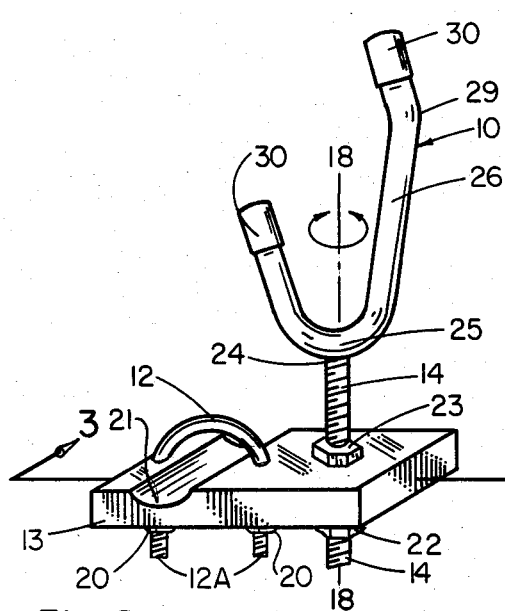
FIG. 2 shows a perspective view of the subject invention apart from its attached handlebars.
Figure 3:
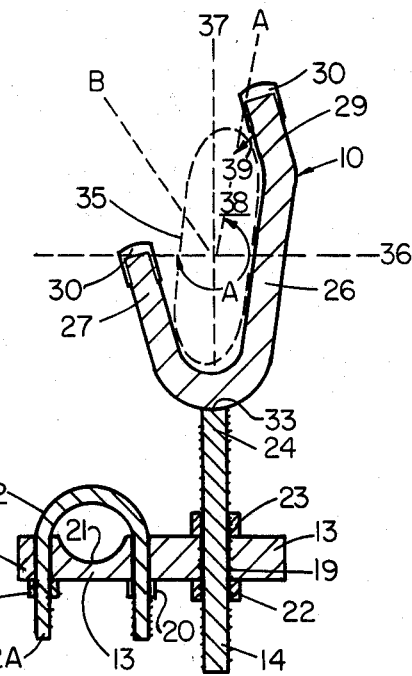

FIG. 3 provides a cutaway view of the subject carrier taken along the lines 3—3 of FIG. 2.

Figure 4:
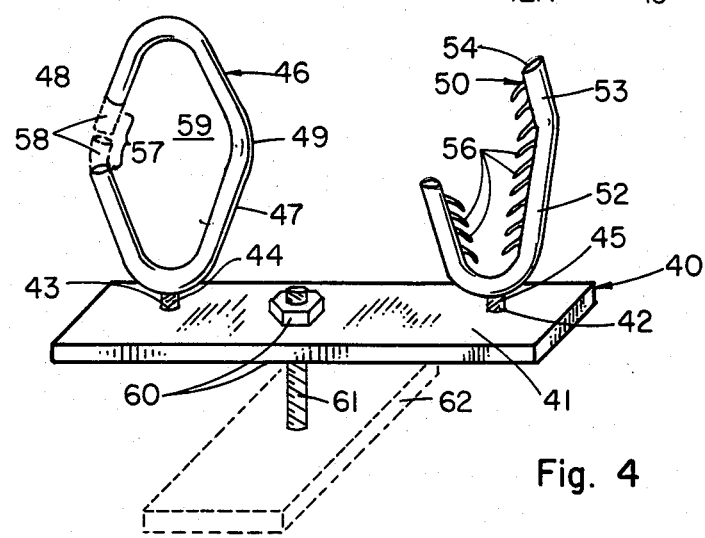

FIG. 4 is a perspective view illustrating an additional embodiment of the subject invention having two different holding members.

DETAILED DESCRIPTION OF THE INVENTION

Figure 1:
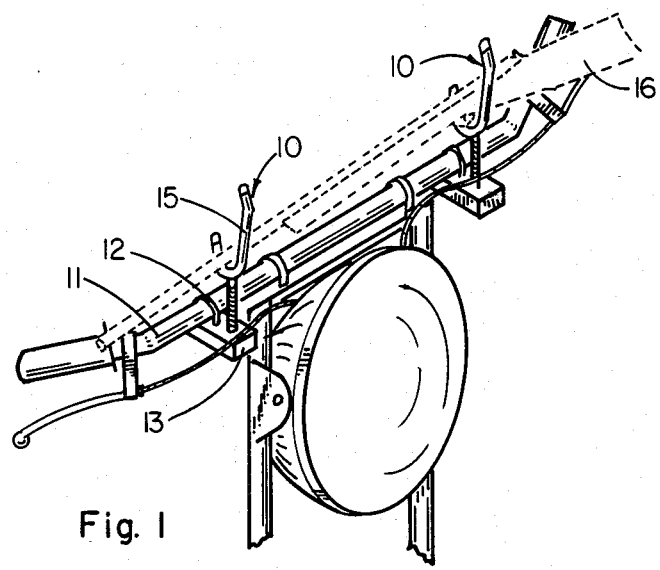
FIG. 1 is a perspective view of a motorcycle handlebar assembly with a pair of carrier devices attached in accordance with the present invention.

Referring now to the drawings:

A utility holding device constructed in accordance with the subject invention is shown generally as item 10. It is designed to provide a carrier which is attachable to the handlebars 11 of a motorcycle and is suitable for carrying a variety of elongated objects such as a rifle, tools, sports equipment, etc., 16. The device includes a clamp means adapted for rigid attachment to the handlebars 11. One embodiment of such clamp means is shown in FIGS. 1-3. It includes an arcuate member 12 which has a curvature suitable for mounting on a handlebar as shown in FIG. 1. The remaining side of the clamp is formed by a curved recess 21 within support base 13. Openings through the support base 13 are provided at the sides adjacent the recess and are adapted in size and configuration to receive extending fingers 12A of the arcuate clamp. Nuts 20 are positioned on threaded ends of the clamp to provide adjustment means for tightening the clamp at the handlebars. It will be apparent that other forms of clamp means can be provided.

The support base 13 shown in the figures operates as a support for the carrier as well as the clamp means. Typically, it is slightly elongated with the clamp on one end and a recessed opening 19 at the other end for receiving a threaded stem 14 which is attached to and supports a holding member 15. The stem may be the threaded portion of a bolt which is welded 33 to the lower part of the holding member 26. Obviously, the thread of the stem 14 and of the threaded opening 19 must be the same size and shape to provide a tight, adjustable fit.

The stem mount 14 is a key part of the inventive structure because it develops the ability to adjust elevation of the carrier 26 as well as enable the holding member to be rotated to lock an object in its grip as shown in FIG. 1. Rotation is oriented about the longitudinal axis 18 of the stem. Accordingly, the level of the holding member is adjustable along this same axis 18.

The stem 14 is attached at its top end to the lower part of the holding member at point 33 and in generally common upright orientation with the arms 26 and 27 of the holding member. This point of attachment places the longitudinal axis 18 approximately within a central portion of the containment area as shown in FIG. 3. The holding member has two parts comprising the upper and lower halves which are formed with a bar bent into the desired configuration. Although the geometry of the holding member will vary, certain common elements are noted. These variations are best understood with respect to the 360 degrees of the four quadrants formed by intersecting horizontal 36 and vertical 37 lines as shown in FIG. 3.

Generally, the lower half of the holding member starts at the horizontal line 36 where the contained area 38 approaches its widest distance, and converges as a tapered U shape down toward the point of attachment 33 of the stem 14. The vertical line 37 is substantially coincident with the longitudinal axis of the stem 14, unless the stem is mounted off-center. The lower half of the holding member is generally configured as a tapered or converging U-shape having upright arms and an intermediate base so that a contained object 35 nests in a secure position toward the base of the V. This tapering structure is significant because it facilitates locking the object in place when the holding member is rotated, as will be discussed hereafter.

At least one side 29 of the holding member extends above the horizontal line 36 and is configured as an elbow which bends toward the contained area 38. This structure provides a cocked configuration which provides a downward force 39 for retaining the carried object 35 in its seated position as the holding member is rotated to lock the object in place. In the example illustrated in FIG. 3, the holding member 10 forms an arcuate structure extending from 0 degrees at the left horizontal line 36 through a continuous arc of about 250 degrees represented by the angle A extending into the upper right quadrant. It will be apparent to one skilled in the art that the holding member will generally extend through an arc A of at least 181 degrees to provide sufficient depth and contoured structure to lock in place. The arc may extend up to approximately 320 degrees B or enough to leave the required opening between the ends of the bar for insertion of the object 35.

The holding member may be constructed of numerous materials including metals and plastics. Specific selection of materials will depend on the characteristics of weight, strength and function desired. Likewise, the stem, support base and clamp means may be of numerous plastic and metal materials; however, metals are preferred because of their strength and rigidity. FIG. 3 also illustrates the use of locking nuts 22 and 23 mounted on the stem at opposing sides of the base 13. These nuts can be tightened to fix the adjusted position of the device.

Rubber caps 30 have been mounted on the ends 27 and 29 of the holding member to offer protection against impact. It will be apparent that various shapes and methods of attachment of such flexible end caps can be applied. In fact, the opening between the ends can be closed off by flexible ends (shown as item 58 in FIG. 4 in phantom lines) which extend across the object opening between the ends of the bar and form a gate through which the object can be pushed.

FIG. 4 also illustrates an additional embodiment having two holding members 46 and 50 supported on a single support base 41. As with previous embodiments, each holding member is attached at its lower end to a stem 44 and 45 which fits into a threaded opening 43 and 42. These openings are positioned on opposite ends of the support base 41 which includes a mounting bolt 61 held in position by a pair of lock nuts 60 (second nut is on the hidden side of the support plate 41). This mounting bolt provides the means for attaching the carrying device 40 to the frame of the vehicle.

The holding members 46 and 50 are configured to handle different types of objects. Member 50 has a configuration similar to that of FIGS. 1-3, but further includes a sheath of flexible fingers 56 which are directionally oriented downward toward the lowest part of the holding member. These fingers may be formed of plastic material which is flexible to allow the fingers to be compressed out of the way upon insertion of an object, but which is resilient to restore to their position and resist inadvertent release of the object.

The embodiment represented by item 46 illustrates a modified configuration wherein the arc of the holding member is continuous through at least 270 degrees and extends up to approximately 320 degrees. The object opening 57 may be substantially closed by flexible ends 58 which impede inadvertent passage of the object from the containing area. These ends 58 are sufficiently flexible to allow the object to be pulled free with a modest force.

The above description of various embodiments of the present invention are given as illustrations of the invention which is defined by the following claims:

I claim:

1. A utility holding device for attachment to handlebars of a mototcycle for carrying elongated objects, said device comprising:
   (a) Clamp means adapted for rigid attachment to the handlebars;
   (b) A support base attached to the clamp means and having a threaded opening therein;
   (c) A mounting stem having a longitudinal axis and a threaded lower section adapted in size and configuration for a tight, adjustable fit within the threaded opening of the support base, said mounting stem providing elevational adjustment with respect to the base;
   (d) A holding member having an upper half and a lower half, said lower half being formed with a U-shape comprising two upright arms and an intermediate base which define a containment area, said lower half being attached at its base to an upper portion of the stem with the stem and arms generally in common upright orientation such that the lower half can be rotated with the stem in the support base about the longitudinal axis to engage and lock the carried object between the upright arms of the lower half of the holding member;

(e) the upper half including an extension of at least one arm of the lower U-shape which is configured as an elbow which bends toward the containment area and provides an upper cocked end to the holding member for engaging an upper part of the contained object and for applying a counter, downward force toward the base of the U-shape to grip and restrain the contained object in a locked position within the holding member;

(f) said upper half further including an open section between opposing ends of the holding member to enable insertion of the elongated object therethrough to the containment area.

2. A motorcycle with handlebars, further including a utility device for carrying elongated objects such as a rifle on a motorcycle, the device comprising a pair of utility holding devices as defined in claim 1 wherein the respective holding devices are attached to a single set of handlebars at the clamp means and can be counter rotated to impose a locking force on the object at the holding members.

3. A holding device as defined in claim 1 wherein the support base comprises an elongated support member wherein the threaded opening is located at one end of the support member and the clamp means is located at the opposing end thereof, said support member forming one side of the clamp means.

4. A holding device as defined in claim 1 wherein the lower half of the holding member is generally U-shaped, said stem being attached at the lowest portion of the U to form a Y-shaped combination.

5. A holding device as defined in claim 1 wherein the holding member is configured such that the bar is continuous through at least 181 degrees of arc.

6. A holding device as defined in claim 1 wherein the holding member is configured such that the bar is continuous through at least 270 degrees of arc.

7. A holding device as defined in claim 1 further comprising flexible end caps positioned at the ends of the holding member to protect against impact.

8. A holding device as defined in claim 1 wherein the clamp means is attached at a central part of the support base and wherein the support base includes a pair of threaded openings at each end thereof, each opening having a threaded stem mounted therein with a holding member attached at the top thereof in accordance with claim 1.

9. A device as defined in claim 1 further comprising a sheath of flexible, resilient fingers attached at interior surfaces of the holding member which are directionally oriented inward and downward toward the lowest part of the holding member and which are adapted to deflect to permit insertion of an object past the fingers with little resistance, yet to impede reverse movement.

10. A holding device as defined in claim 1, wherein the upright arms of the U-shaped lower half converge from a wider section at the top toward a narrow section at the base to permit the carried object to nest between the arms in a secure position.

11. A holding device as defined in claim 10 wherein the longitudinal axis of the attached stem passes approximately through a central portion of the containment area to thereby facilitate engagement of the carried object by both arms of the holding member with minimum change of position of said object.

12. A utility holding device for attachment to a motorcycle having a frame for carrying elongated objects, said device comprising:

(a) Means adapted for rigid attachment to the frame;

(b) A support base attached to the rigid attachment means and having a pair of threaded openings therein;

(c) A pair of mounting stems, each having a longitudinal axis and a threaded, lower section adapted in size and configuration for a tight, adjustable fit within the threaded opening of the support base, said mounting stems providing elevational adjustment with respect to the base;

(d) A pair of holding members each having an upper half and a lower half, said lower half being formed with a U-shape comprising two upright arms and an intermediate base which define a containment area, said lower half being attached at its base to an upper portion of the stem with the stem and arms generally in common upright orientation such that the lower half can be rotated with the stem in the support base about the longitudinal axis to engage and lock the carried object between the upright arms of the lower half of the holding member;

(e) The upper half including an extension of at least one arm of the lower U-shape which is configured as an elbow which bends toward the containment area and provides an upper cocked end to the holding member for engaging an upper part of the contained object and for applying a counter, downward force toward the base of the U-shape to grip and restrain the contained object in a locked position within the holding member;

(f) Said upper half further including an open section between opposing ends of the holding member to enable insertion of the elongated object therethrough to the containment area.

* * * * *